United States Patent
Nagafuchi et al.

(10) Patent No.: US 9,864,565 B2
(45) Date of Patent: Jan. 9, 2018

(54) OUTPUT SYSTEM, OUTPUT APPARATUS, AND POWER CONTROL METHOD

(71) Applicants: Tatsuya Nagafuchi, Kanagawa (JP); Junichi Hara, Kanagawa (JP); Shinji Aoki, Kanagawa (JP); Shigeyuki Ishii, Kanagawa (JP); Tatsuroh Sugioka, Kanagawa (JP)

(72) Inventors: Tatsuya Nagafuchi, Kanagawa (JP); Junichi Hara, Kanagawa (JP); Shinji Aoki, Kanagawa (JP); Shigeyuki Ishii, Kanagawa (JP); Tatsuroh Sugioka, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 167 days.

(21) Appl. No.: 14/721,041

(22) Filed: May 26, 2015

(65) Prior Publication Data

US 2015/0371603 A1 Dec. 24, 2015

(30) Foreign Application Priority Data

Jun. 19, 2014 (JP) ................. 2014-126377

(51) Int. Cl.
*G06F 3/147* (2006.01)

(52) U.S. Cl.
CPC ....... *G06F 3/147* (2013.01); *G09G 2330/021* (2013.01); *G09G 2330/022* (2013.01); *G09G 2380/06* (2013.01)

(58) Field of Classification Search
CPC ............... G06F 3/147; G09G 2380/06; G09G 2330/022; G09G 2330/021
See application file for complete search history.

(56) References Cited

U.S. PATENT DOCUMENTS

| 8,254,039 | B2 | 8/2012 | Fujita et al. | |
|---|---|---|---|---|
| 2009/0096772 | A1* | 4/2009 | Kinoshita | G09G 3/22 345/204 |
| 2010/0333006 | A1* | 12/2010 | Ostergard | G02B 26/005 715/768 |
| 2011/0310073 | A1* | 12/2011 | Nagata | G06F 3/1423 345/207 |

(Continued)

FOREIGN PATENT DOCUMENTS

| JP | 2009-145365 | 7/2009 |
|---|---|---|
| JP | 2010-085973 | 4/2010 |
| JP | 2013-044735 | 3/2013 |

*Primary Examiner* — Premal Patel
(74) *Attorney, Agent, or Firm* — IPUSA, PLLC

(57) ABSTRACT

An output system is provided that includes at least one output apparatus configured to output content information. The output system includes a determination part configured to determine, based on the content information, whether to generate first control information for switching the output apparatus to a power-saving mode, the first control information being generated with respect to the output apparatus that does not have to output the content information. The output system further includes a control information generation part configured to generate the first control information when the determination part determines that the first control information has to be generated and a power control part configured to switch the output apparatus to the power-saving mode based on the first control information.

5 Claims, 7 Drawing Sheets

(56) References Cited

U.S. PATENT DOCUMENTS

| | | | |
|---|---|---|---|
| 2011/0316844 A1* | 12/2011 | Alberth | G06F 1/3218 345/214 |
| 2012/0071149 A1* | 3/2012 | Bandyopadhyay | G06F 1/1643 455/418 |
| 2013/0050590 A1 | 2/2013 | Nobutani | |
| 2013/0246826 A1* | 9/2013 | Hollingworth | G06F 1/3203 713/324 |
| 2013/0335298 A1* | 12/2013 | Karmanenko | G06F 1/1626 345/1.3 |
| 2014/0314239 A1* | 10/2014 | Meyer | G06F 3/165 381/58 |
| 2014/0368478 A1* | 12/2014 | Chu | G06F 3/1415 345/204 |

* cited by examiner

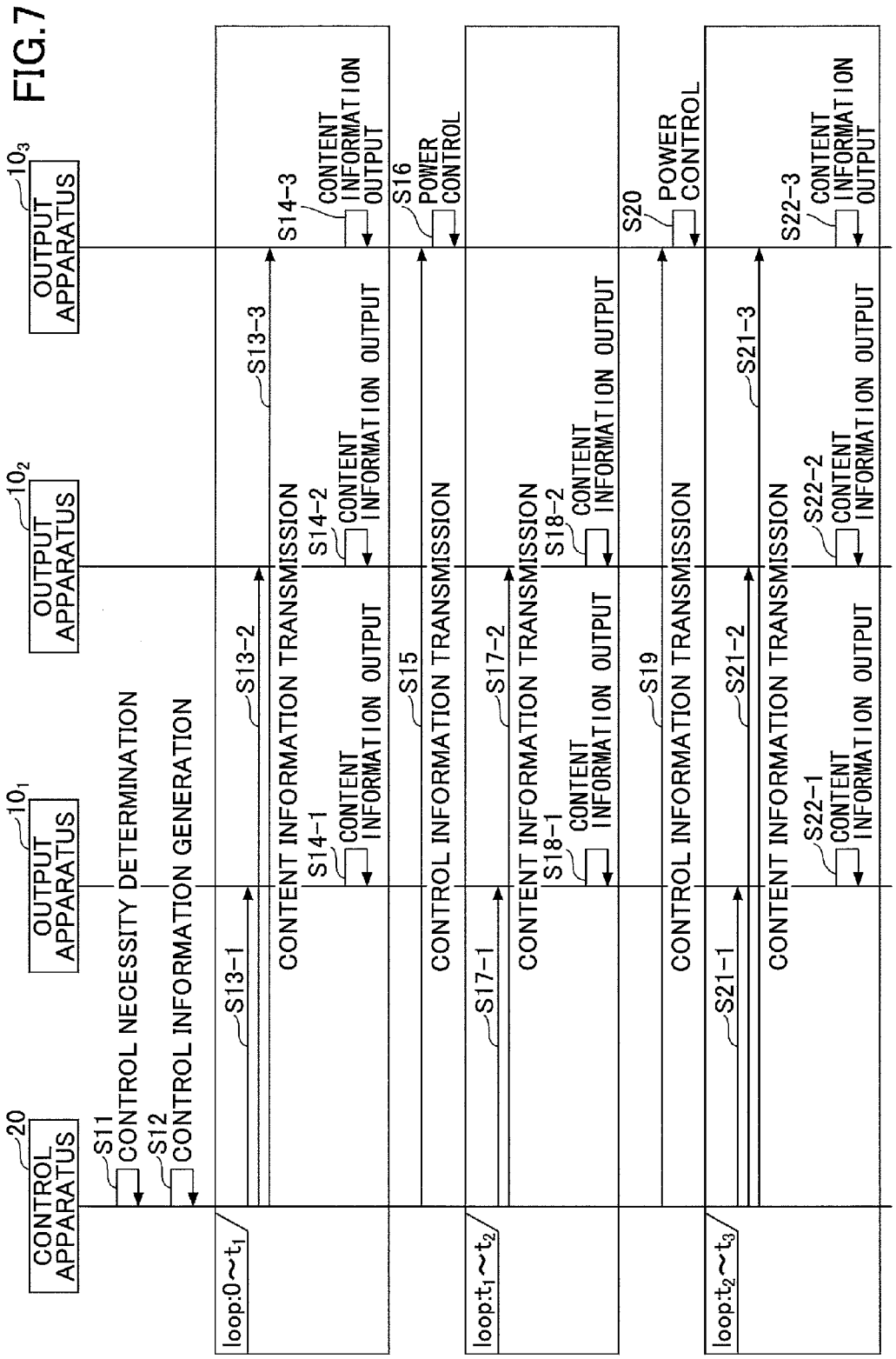

OUTPUT SYSTEM, OUTPUT APPARATUS, AND POWER CONTROL METHOD

BACKGROUND OF THE INVENTION

1. Field of the Invention

The present invention relates to an output system, an output apparatus, and a power control method.

2. Description of the Related Art

Projection systems are known that are configured to display a single large image using a plurality of projection apparatuses.

Also, techniques for controlling the operation of a projection apparatus with respect to each frame are conventionally known (see e.g., Japanese Laid-Open Patent Publication No. 2013-044735).

However, in conventional projection systems that use a plurality of projection apparatuses, power may be unnecessarily consumed by one or more projection apparatuses that are currently not projecting an image. That is, even projection apparatuses that are not projecting an image remain in operation to thereby consume unnecessary power.

SUMMARY OF THE INVENTION

An aspect of the present invention relates to reducing the power consumption of an output apparatus that is not outputting content information.

According to one embodiment of the present invention, an output system is provided that includes at least one output apparatus configured to output content information. The output system includes a determination part configured to determine, based on the content information, whether to generate first control information for switching the output apparatus to a power-saving mode, the first control information being generated with respect to the output apparatus that does not have to output the content information. The output system further includes a control information generation part configured to generate the first control information when the determination part determines that the first control information has to be generated and a power control part configured to switch the output apparatus to the power-saving mode based on the first control information.

BRIEF DESCRIPTION OF THE DRAWINGS

FIG. 7 is a sequence chart illustrating exemplary process operations of the output system according to an embodiment of the present invention.

DESCRIPTION OF THE PREFERRED EMBODIMENTS

In the following, embodiments of the present invention are described with reference to the accompanying drawings.

System Configuration

Figure 1:
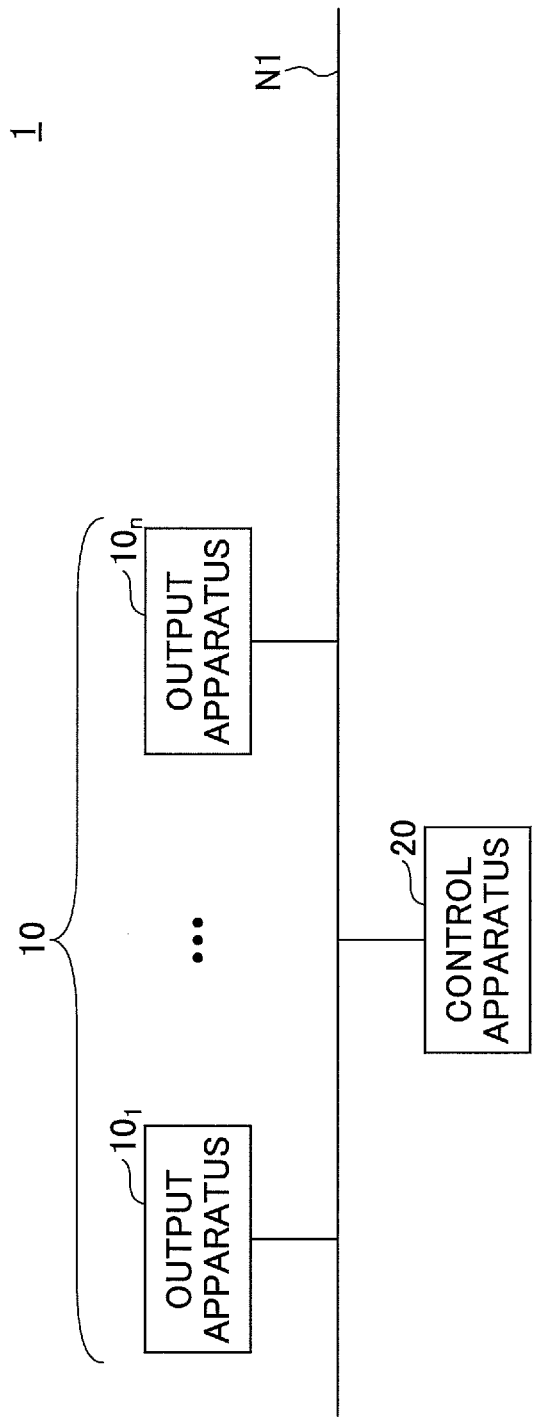
FIG. 1 illustrates an exemplary configuration of an output system according to an embodiment of the present invention.

In the following, a configuration of an output system 1 according an embodiment of the present invention is described. FIG. 1 is a block diagram illustrating an exemplary configuration of the output system 1 according to the present embodiment. In FIG. 1, the output system 1 includes one or more output apparatuses 10 and a control apparatus 20 that are connected to a network N1 wirelessly or via a cable, for example.

The one or more output apparatuses 10 are configured to output content information such as image data of a plurality of images onto a single display surface, for example. The output apparatus 10 may also output audio data in place of or along with image data, for example. The output apparatus 10 may be a projection apparatus such as a projector, a display apparatus such as a display or a TV, or an audio output apparatus such as audio equipment, for example. That is, the content information output by the output apparatus 10 may include either one of image data for outputting an image or audio data for outputting a sound (sound wave), or the content information may include both image data and audio data. In the following, an exemplary case is described in which the content information includes both image data and audio data and the output apparatus 10 is a projection apparatus such as a projector that outputs an image corresponding to the image data and a sound (sound wave) corresponding to the audio data.

Note that the image data included in the content information is not limited to image data of a still image but may also be image data of a moving image. Also, the projector may be any type of projector including a DLP (Digital Light Processing) projector, a liquid crystal projector, and the like.

Also, the output system 1 of the present embodiment is capable of synchronizing the output timings of content information output by a plurality of output apparatuses 10 to display the images projected by these output apparatuses 10 as a single image. Note that in the following descriptions, the plurality of output apparatuses 10 are represented as output apparatus $10_1$, output apparatus $10_2$, . . . , output apparatus $10_n$, when they need to be distinguished from one another.

The control apparatus 20 is an apparatus that controls the plurality of output apparatuses 10. The control apparatus 20 controls the output apparatuses 10 to synchronize the output timings of content information output by these output apparatuses 10. Also, the control apparatus 20 performs power control of the output apparatuses 10 based on the content information output by the output apparatuses 10 in order to reduce the overall power consumption of the output system 1.

Note that in some embodiments, the output system 1 may be configured without the control apparatus 20. In this case, the functions of the control apparatus 20 may be included in the output apparatuses 10. That is, in this case, each of the output apparatuses 10 may be configured to control output timings of content information to be in sync with the content information output timings of the other output apparatuses 10 and perform power control of the other output apparatuses 10 based on the content information output by the other output apparatuses 10, for example.

Hardware Configuration

In the following, hardware configurations of the output apparatus 10 and the control apparatus 20 of the output system 1 according to the present embodiment are described.

Output Apparatus

Figure 2:
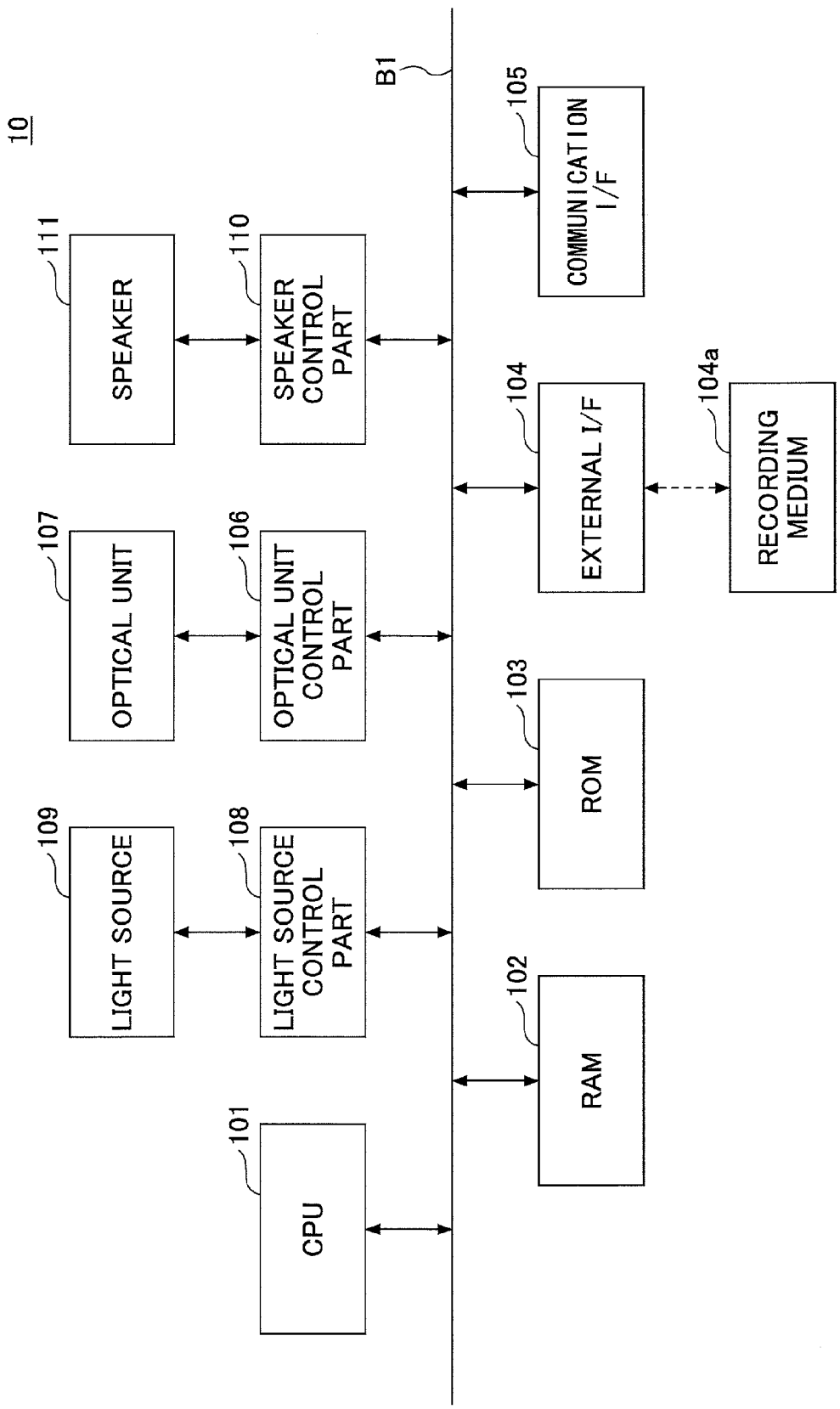
FIG. 2 illustrates an exemplary hardware configuration of an output apparatus according to an embodiment of the present invention.

FIG. 2 is a block diagram illustrating an exemplary hardware configuration of the output apparatus 10 according to the present embodiment. The output apparatus 10 of the present embodiment includes a CPU (Central Processing Unit) 101, a RAM (Random Access Memory) 102, a ROM (Read Only Memory) 103, an external I/F (interface) 104, a communication I/F 105, an optical unit control part 106, a light source control part 108, and a speaker control part 110 that are interconnected by a bus B1. The optical unit control part 106, the light source control part 108, and the speaker control part 110 are respectively connected to an optical unit 107, a light source 109, and a speaker 111.

The CPU 101 is a computing unit that reads programs and data from a storage device such as the ROM 103, loads the programs and data on the RAM 102, and executes relevant processes to implement the various functions of the output apparatus 10 or perform overall control operations of the output apparatus 10. The RAM 102 is a volatile semiconductor memory (storage device) for temporarily storing programs and data. The ROM 103 is a non-volatile semiconductor memory (storage device) that is capable of retaining programs and data even when the power is turned off. The output apparatus 10 may further include a non-volatile storage device such as an HDD (Hard Disk Drive) or a SSD (Solid State Drive), for example.

The external I/F 104 is an interface with an external device. The external device may be a recording medium 104a, for example. The recording medium 104a may store content information to be output by the output apparatus 10 and programs for implementing various functional features of the present embodiment, for example. The output apparatus 10 may read/write data from/on the recording medium 104a via the external I/F 104.

The communication I/F 105 is an interface for establishing connection with the network N1. In this way, the output apparatus 10 may establish communication with the control apparatus 20 and the other output apparatuses 10 via the communication I/F 105.

The optical unit control part 106 controls the optical unit 107 to project an image corresponding to image data output to the RAM 102 or a buffer memory (not shown), for example. The optical unit 107 may be a unit (part) including optical components such as a lens and a mirror, for example.

The light source control part 108 controls the light source 109 such that the power of the light source 109 may be turned on/off, for example. The light source 109 may be a mercury lamp or the like, for example.

The speaker control unit 110 controls the speaker 111 to output audio data that is output to the RAM 102 or the buffer memory (not shown), for example. The speaker 111 is an apparatus that generates a sound (sound wave) corresponding to the audio data. Note that in some embodiments, the speaker 111 may be connected to the external I/F 104, for example.

Note that in a case where the content information only includes image data (i.e., the output apparatus 10 only outputs an image), the output apparatus 10 may not have to include the speaker control part 110 and the speaker 111. Similarly, in a case where the content information only includes audio data (i.e., the output apparatus 10 only outputs a sound), the output apparatus 10 may not have to include the optical unit control part 106, the optical unit 107, the light source control part 108, and the light source 109.

Control Apparatus

Figure 3:
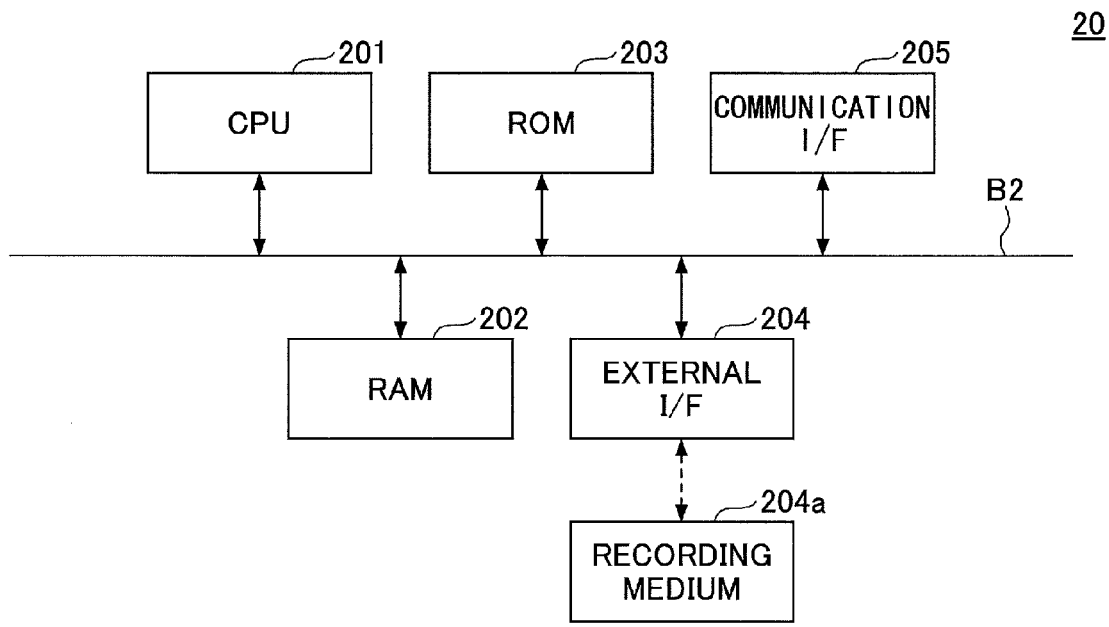
FIG. 3 illustrates an exemplary hardware configuration of a control apparatus according to an embodiment of the present invention.

FIG. 3 is a block diagram illustrating an exemplary hardware configuration of the control apparatus 20 according to the present embodiment. The control apparatus 20 according to the present embodiment includes a CPU 201, a RAM 202, a ROM 203, an external I/F 204, and a communication I/F 205 that are interconnected by a bus B2.

The CPU 201 is a computing unit that reads programs and data from a storage device such as the ROM 203, loads the programs and data on the RAM 202, and executes relevant processes for implementing the functions of the control apparatus 20 and performing overall control operations of the control apparatus 20. The RAM 202 is a volatile semiconductor memory (storage device) for temporarily storing programs and data. The ROM 203 is a non-volatile semiconductor memory (storage device) capable of retaining programs and data even when the power is turned off. The control apparatus 20 may further include a non-volatile storage device such as an HDD or an SSD, for example.

The external I/F 204 is an interface with an external device. The external device may be a recording medium 204a, for example. The recording medium 204a may store content information to be output by the output apparatus 10 and programs for implementing various functional features of the present embodiment. The control apparatus 20 may read/write data from/on the recording medium 204a via the external I/F 204, for example.

The communication I/F 205 is an interface for establishing connection with the network N1. In this way, the control apparatus 20 may establish communication with the output apparatus 10 via the communication I/F 205.

By arranging the output apparatus 10 and the control apparatus 20 according to the present embodiment to have the hardware configurations as described above, for example, various process operations as described below may be implemented.

Software Configuration

Figure 4:
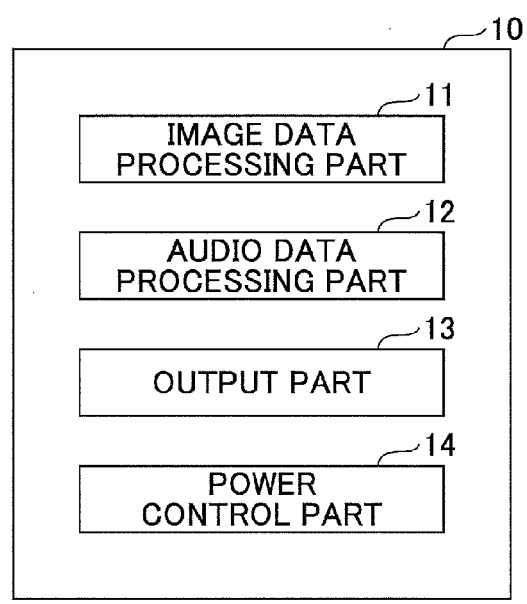
FIG. 4 illustrates an exemplary functional configuration of the output apparatus according to an embodiment of the present invention.

In the following, software configurations of the output apparatus 10 and the control apparatus 20 of the output system 1 according to the present Output Apparatus FIG. 4 is a block diagram illustrating an exemplary functional configuration of the output apparatus 10 according to the present embodiment. The output apparatus 10 of the present embodiment includes an image data processing part 11, an audio data processing part 12, an output part 13, and a power control part 14.

The image data processing part 11 inputs the image data included in the content information and performs a predetermined process thereon. The image data processing part 11 then writes the resulting processed image data on the RAM 102 or a buffer memory (not shown), for example.

Note that the input image data may be a video signal such as an RGB signal or an HDMI (High-Definition Multimedia Interface) (registered trademark) signal, for example. Also, the input image data may be electronic data in a multimedia format such as the MPEG (Moving Picture Experts Group) format for generating such video signal, for example. Also, the input image data may include a rendering instruction and document data subject to the rendering instruction, for example.

The predetermined process performed on the image data input to the image data processing part 11 may include a gamma conversion and various filtering processes, for example. Also, in the case where the image data input to the image data processing part 11 corresponds to electronic data in a multimedia format such as the MPEG format, the predetermined process may be a decoding process, for example.

The audio data processing part 12 receives the audio data included in the content information and performs a predetermined process thereon. Then, the audio data processing part 12 writes the resulting processed audio data on the RAM 102 or the buffer memory (not shown).

Note that the input audio data may be PCM (Pulse Code Modulation) data, electronic data in a multimedia format such as the MPEG format, or MIDI (Musical Instrument Digital Interface) data, for example.

The predetermined process performed on the audio data input to the audio data processing part 12 may include volume adjustment, tone adjustment, and various filtering processes, for example. Also, in the case where the audio data input to the audio data processing part 12 corresponds to electronic data in a multimedia format such as the MPEG format, the predetermined process may be a decoding process, for example. Also, in the case where the audio data input to the audio data processing part 12 corresponds to MIDI data, the predetermined process may be a rendering process, for example.

The output part 13 outputs the data written on the RAM 102 or the buffer memory (not shown) by the image data processing part 11 or the audio data processing part 12. That is, the output unit 13 displays an image corresponding to the image data written on the RAM 102 or the buffer memory by projecting the image data according to control by the optical unit control part 106 and the light source control part 108. Also, the output unit 13 generates a sound (sound wave) corresponding to the audio data written on the RAM 102 or the buffer memory by outputting the audio data according to control by the speaker control part 110.

The power control part 14 performs power control of the light source 109 and the speaker 111, via the light source control part 108 and the speaker control part 110, based on control information received from the control apparatus 20. That is, for example, upon receiving control information from the control part 20 for turning off the power of the light source 109, the power control part 14 turns off the power of the light source 109 via the light source control part 108. Similarly, for example, upon receiving control information from the control apparatus 20 for turning off the power of the speaker 111, the power control part 14 turns off the power of the speaker 111 via the speaker control part 110.

Control Apparatus

Figure 5:
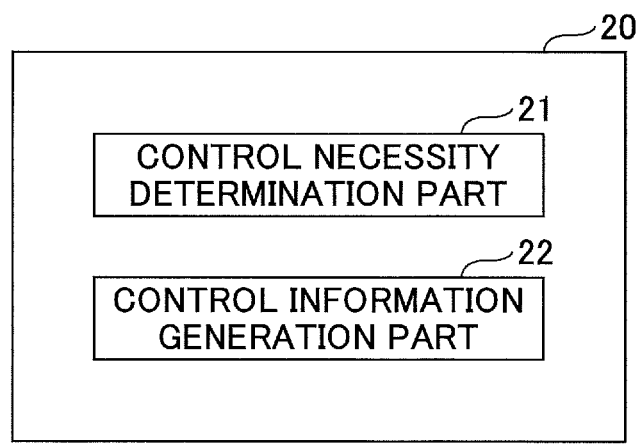
FIG. 5 illustrates an exemplary functional configuration of the control apparatus according to an embodiment of the present invention.

FIG. 5 is a block diagram illustrating an exemplary functional configuration of the control apparatus 20 according to the present embodiment. The control apparatus 20 of the present embodiment includes a control necessity determination part 21 and a control information generation part 22.

The control necessity determination part 21 determines whether to generate control information for performing power control of the output apparatus 10. For example, the control necessity determination part 21 may determine that control information for turning off the power of the light source 109 has to be generated if there has been no image data input to the output apparatus 10 for a certain time period. Similarly, for example, the control necessity determination part 21 may determine that control information for turning off the speaker 111 has to be generated if there has been no audio data input to the output apparatus 10 for a certain time period.

The control information generation part 22 generates control information for performing power control of the output apparatus 10 in accordance with the determination result of the control necessity determination unit 21.

Process Overview

Figure 6A:
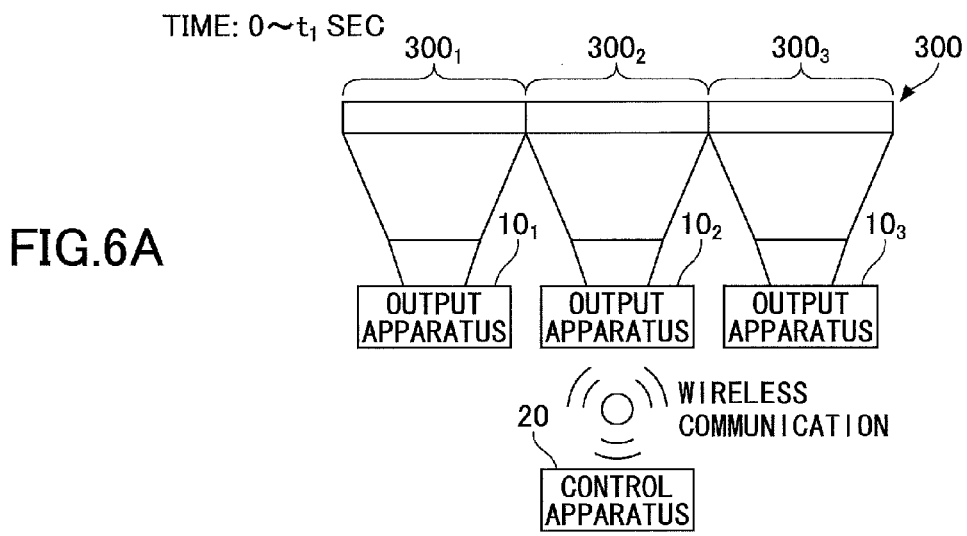
FIGS. 6A-6C illustrate exemplary process operations of the output system according to an embodiment of the present invention.
Figure 6B:
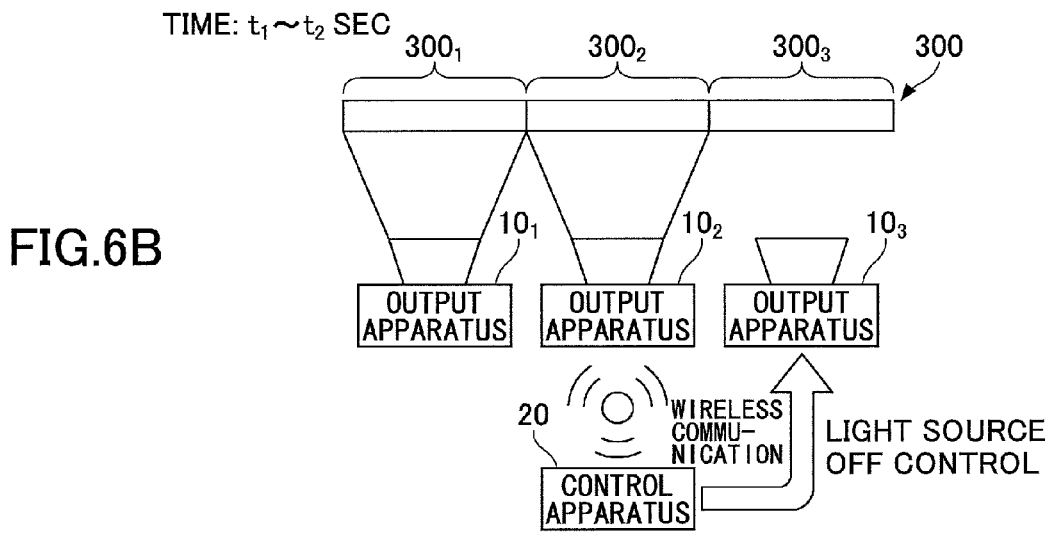
Figure 6C:
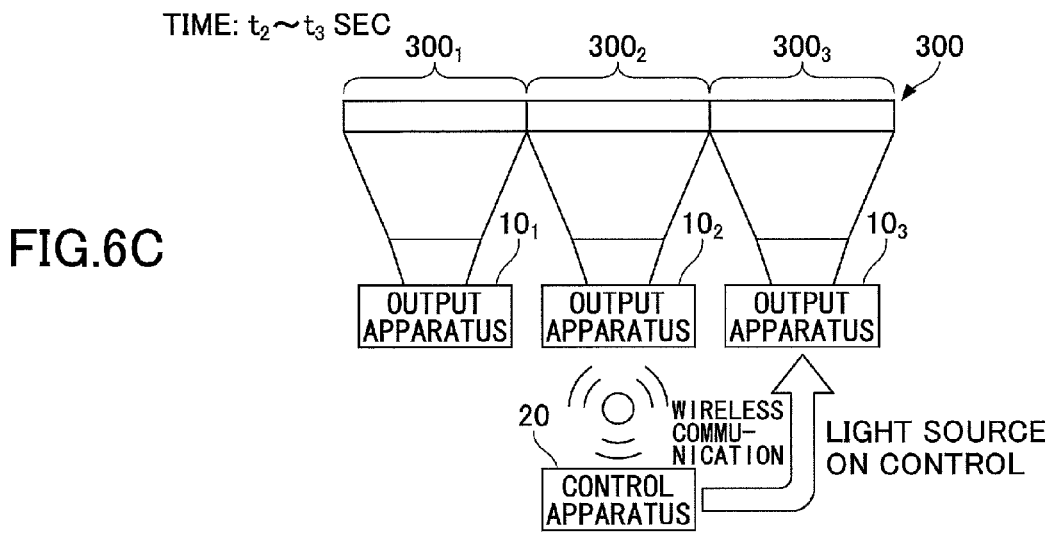

The following is an overview of process operations executed in the output system 1 according to the present embodiment. FIGS. 6A-6C illustrate exemplary process operations of the output system 1 according to the present embodiment. Specifically, FIGS. 6A-6C illustrate an exemplary case of projecting video images on a screen 300 using an output apparatus $10_1$, an output apparatus $10_2$, and an output apparatus $10_3$. The control apparatus 20 transmits content information including image data to the output apparatuses 10 by wireless communication via the network N1. Also, the control apparatus 20 transmits control information to the output apparatuses 10 by wireless communication via the network N1.

Note that an area of the screen 300 where an image projected by the output apparatus $10_1$ is displayed is denoted as area $300_1$, an area of the screen 300 where an image projected by the output apparatus $10_2$ is displayed is denoted as area $300_2$, and an area of the screen 300 where an image projected by the output apparatus $10_3$ is displayed is denoted as area $300_3$. Also, content information may be stored in the recording medium 204a that is connected to the control apparatus 20, for example. In the present example, image data included in the content information corresponds to video data with a replay time (time required to complete data output) of $t_3$ seconds.

FIG. 6A illustrates a case where each of the output apparatuses $10_1$-$10_3$ is projecting an image on the screen 300. That is, each of the output apparatuses $10_1$-$10_3$ is projecting an image (video) based on content information including image data received from the control apparatus 20.

In the present example, it is assumed that the control apparatus 20 determines that the output apparatus $10_3$ does not have to project an image during the time period between $t_1$-$t_2$ seconds. In other words, the control apparatus 20 determines that control information for turning off the power of the light source 109 of the output apparatus $10_3$ during the time period between $t_1$-$t_2$ seconds has to be generated. In turn, as illustrated in FIG. 6B, the control apparatus 20 transmits such control information for turning off the light source 109 of the output apparatus $10_3$ to the output apparatus $10_3$. The output apparatus $10_3$ turns off the power of the light source 109 based on the received control information. In this way, the power of the light source power 109 of the output apparatus $10_3$ may be turned off while the output apparatus $10_3$ is not projecting an image to thereby prevent unnecessary power consumption. Note that cases where the output apparatus $10_3$ does not have to project an image during the time period between $t_1$-$t_2$ seconds may include a case where a video signal is not input to the output apparatus $10_3$ and a case where an image to be projected by the output apparatus $10_3$ based on an input video signal corresponds to a black image, for example.

Then, it is assumed that the control apparatus 20 determines that during the time period between $t_2$-$t_3$ seconds, the output apparatus $10_3$ has to project image data. In other words, the control apparatus 20 determines that control information for turning on the power of the light source 109 of the output apparatus $10_3$ during the time period between $t_2$-$t_3$ seconds has to be generated. In turn, as illustrated in FIG. 6C, the control apparatus 20 transmits such control information for turning on the power of the light source 109 of the output apparatus $10_3$ to the output apparatus $10_3$. Then, the output apparatus $10_3$ turns on the power of the light source 109 based on the received control information. In this way, the output apparatus $10_3$ may be able to project an image once again.

Note that process operations similar to those described above may be implemented to control the power of the speaker 111 of the output apparatus 10 in the case where content information includes audio data. In this way, upon determining that at least one of the output apparatuses of the output system 1 does not have to output content information, the control apparatus 20 transmits control information for turning off the power of the light source 109 or the speaker 111 to the output apparatus 10 that is subject to power control. Also, with respect to an output apparatus 10 that has the power of its light source 109 or speaker 111 turned off, the control apparatus 20 transmits control information for turning on the light source 109 or the speaker 111 to the output apparatus 10 subject to power control upon determining that the output apparatus 10 has to output content information once again.

Note that the control apparatus 20 may determine whether each output apparatus 10 has to output content information by decoding the content information in advance. For example, the control apparatus 20 may decode content information for the output apparatus $10_3$ in advance to acquire information on the presence/absence of image data to be projected in the content information. If there is no image data to be projected by the output apparatus $10_3$ for a certain time period, the control apparatus 20 may determine that the output apparatus $10_3$ does not have to output content information during this time period.

Process Details

In the following, process operations of the output system 1 according to the present embodiment are described in greater detail. FIG. 7 is a sequence chart illustrating exemplary process operations of the output system according to the present embodiment. Note that in the following, an example similar to the example illustrated in FIG. 6 is described in which the power of the light source 109 of the output apparatus $10_3$ is controlled to be off for a certain time period.

First, the control necessity determination part 21 of the control apparatus 20 reads content information stored in the recording medium 204a, for example, and performs a predetermined process such as a decoding process on the content information to determine whether control information for the output apparatus 10 has to be generated (step S11). That is, as described above, the control necessity determination part 21 of the control apparatus 20 decodes the content information in advance to acquire information on the presence/absence of image data to be projected by each output apparatus 10. If there is no image data to the projected by an output apparatus 10 for a certain time period, the control necessity determination part 21 determines that control information for turning off the power of the light source 109 of this output apparatus 10 during this time period has to be generated. In the following descriptions, as in the example illustrated in FIG. 6 it is assumed that the output apparatus $10_3$ does not have to project image data during the time period between $t_1$-$t_2$ seconds. Accordingly, the control necessity determination part 21 of the control apparatus 20 determines that control information for turning off the power of the light source 109 of the output apparatus $10_3$ during the time period between $t_1$-$t_2$ seconds, and control information for turning on the power of the light source 109 of the output apparatus $10_3$ after $t_2$ seconds have to be generated.

Note that cases where the control necessity determination part 21 determines that control information needs to be generated are not limited to the case described above. For example, the control necessity determination part 21 may determine that control information needs to be generated when image data to be projected by an output apparatus 10 during a certain time period corresponds to image data of a black image or an image close to a black image. Similarly, the control necessity determination part 21 may determine that control information needs to be generated when the luminance or the brightness of image data to be projected by an output apparatus 10 during a certain time period is extremely low, for example. In this case, a threshold for the luminance or brightness of image data that would trigger a determination that control information needs to be generated may be set up in advance in the control apparatus 20, for example.

Also, in a case where the output apparatus 10 does not output audio data for a certain time period, for example, the control necessity determination part 21 may determine that control information for turning off the power of the speaker 111 of the output apparatus 10 during this time period and control information for turning on the power of the speaker 111 after the this time period elapses need to be generated. Similarly, the control necessity determination unit 21 may determine that such control information needs to be generated when the volume of the sound (audio data) to be output by the output apparatus 10 during a certain time period is extremely low, for example. In this case, a threshold for the volume of the audio data that would trigger a determination that control information has to be generated may be set up in advance in the control apparatus 20.

Then, the control information generation part 22 of the control apparatus 20 generates control information for controlling the power of the output apparatus 10 in accordance with the determination result of the control necessity determination part 21 (step S12). In the following descriptions, it is assumed that the control information generation unit 22 generates control information for turning off the power of the light source 109 of the output apparatus $10_3$ and control information for turning on the power of the light source 109 of the output apparatus $10_3$.

Note, however, that the control information generated by the control information generation part 22 is not limited to those described above. For example, the control information generation part 22 may generate control information for reducing the power consumption of the light source 109 and the speaker 111 (e.g., control information for reducing the amount of light emitted by the light source 109, or control information for reducing the output of the speaker 111).

Then, the control apparatus 20 transmits the content information to each of the output apparatuses $10_1$-$10_3$ (steps S13-1 to S13-3). Upon receiving the content information from the control apparatus 20, the image data processing part 11 and the audio data processing part 12 of each of the output apparatuses $10_1$-$10_3$ perform predetermined processes on the content information, for example. Then, the output part 13 of each of the output apparatuses $10_1$-$10_3$ outputs the content information (steps S14-1 to S14-3). In this way, each of the output apparatuses $10_1$-$10_3$ may project image data on the screen 300. Steps S13 and S14 are repeatedly executed while the replay time of the content information is between 0 to $t_1$ seconds.

Note that in the case of projecting image data, the output apparatus 10 projects the image data using the optical unit 107, which is controlled by the optical unit control part 106, and the light source 109, which is controlled by the light source control part 108. Similarly, upon outputting audio data, the output apparatus 10 outputs the audio data using the speaker 111, which is controlled by the speaker control part 110.

Then, the control apparatus 20 transmits the control information for turning off the power of the light source 109 of the output apparatus $10_3$ generated in step S12 to the output apparatus $10_3$ (step S15). Then, upon receiving the above control information from the control apparatus 20, the power control part 14 of the output apparatus $10_3$ instructs the light source control part 108 to turn off the power of the light source 109, and in turn, the light source control part 108 turns off the power of the light source 109 (step S16). In this way, power consumption of the light source 109 of the output apparatus $10_3$ may be reduced after this point.

Then, the control apparatus 20 transmits the content information to each of the output apparatuses $10_1$ and $10_2$ (steps S17-1 and S17-2). Upon receiving the content information from the control apparatus 20, the image data processing part 11 and the audio data processing part 12 of each of the output apparatuses $10_1$ and $10_2$ perform predetermined processes on the content information. Then, the output part 13 of each of the output apparatuses $10_1$ and $10_2$ outputs the content information (steps S18-1 and S18-2). Steps S17 and S18 are repeatedly executed while the replay time of the content information is between $t_1$-$t_2$ seconds. At this time, the output apparatus $10_3$ does not output any content information.

Then, the control apparatus 20 transmits the control information for turning on the power of the light source 109 of the output apparatus $10_3$ generated in step S12 to the output apparatus $10_3$ (step S19). Upon receiving the control information from the control apparatus 20, the power control part 14 of the output apparatus $10_3$ instructs the light source control part 108 to turn on the power of the light source 109, and in turn, the light source control part 108 turns on the power of the light source 109 (step S20). In this way, the output apparatus $10_3$ may be able project image data included in the content information once again.

Note that, for example, assuming that a time period of $\Delta t$ seconds is required before the power of the light source 109 or the speaker 111 may actually be turned back on from the time the output apparatus 10 receives the control information for turning on the power of the light source 109 or the speaker 111, the control apparatus 20 transmits the control information to the output apparatus 10 $\Delta t$ seconds before the time the power of the light source 109 or the speaker 111 needs to be turned on. In this way, the power of the light source 109 or the speaker 111 may be turned on in accordance with the timing at which the output apparatus 10 is to output the content information. Note that such a time ($\Delta t$) required to start the light source 109 or the speaker 111 may be stored in advance in a storage device of the control apparatus 20, for example.

Then, the control apparatus 20 transmits the content information to each of the output apparatuses $10_1$-$10_3$ (steps S21-1 to S21-3). Upon receiving the content information from the control apparatus 20, the image data processing part 11 and the audio data processing part 12 of each of the output apparatuses $10_1$-$10_3$ perform predetermined processes on the content information. Then, the output part 13 of each of the output apparatuses $10_1$-$10_3$ outputs the content information (steps S22-1 to S22-3). Steps S21 and S22 may be repeatedly executed while the replay time of the content information is between $t_2$-$t_3$ seconds.

As described above, in the output system 1 according to the present embodiment, control information for controlling the power of the output apparatus 10 is generated based on content information. Then, the output apparatus 10 performs power control based on the control information received from the control apparatus 20. In this way, the output system 1 may reduce unnecessary power consumption and achieve power conservation.

Note that in above descriptions of the present embodiment, power control is performed on a single output apparatus 10 (output apparatus $10_3$) of the plurality of output apparatuses $10_1$-$10_3$. However, processes similar to those described above may be implemented to control the power of two or more output apparatuses 10. Also, in some embodiments, only certain output apparatuses 10 may be subject to power control. For example, power control may not be performed on the output apparatus $10_1$ of the plurality of output apparatuses $10_1$-$10_3$, and power control may only be performed with respect to the output apparatuses $10_2$ and $10_3$. That is, in some embodiments, the control apparatus 20 may be set up to perform power control on one or more specific output apparatuses 10 of the plurality of output apparatuses 10.

Also, for example, when an external speaker is connected to the external I/F 204 of the control apparatus 20, the control apparatus 20 may transmit control information for turning off the power of the speaker 111 to each of the output apparatuses 10 such that audio data included in content information may be output from the external speaker instead of the individual speakers 111.

Application

In the following, an application of the output system 1 according to the present embodiment is described. FIGS. 8A-8D illustrate an exemplary application of the output system 1 according to the present embodiment. Specifically, FIGS. 8A-8D illustrate an example in which the output system 1 of the present embodiment is applied to a digital signage system for displaying advertisements and the like. Note that in the following descriptions, it is assumed that each output apparatus 10 of the output system 1 includes a display 400 and a display control part (not shown) for controlling the display 400 instead of the optical unit control part 106, the optical unit 107, the light source control part 108, and the light source 109.

Figure 8A:
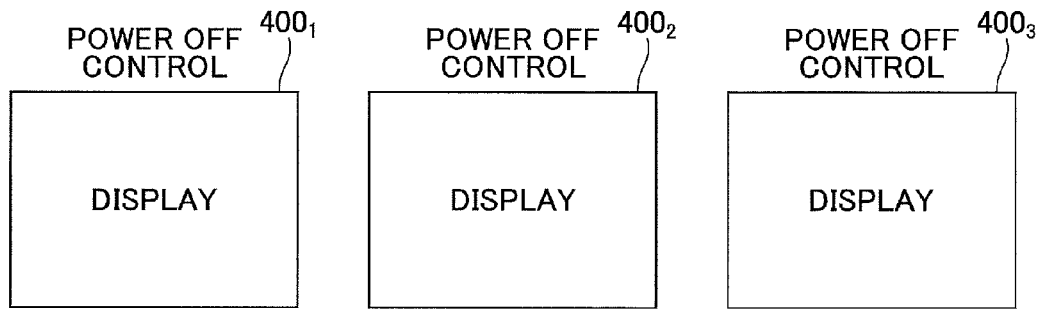
FIGS. 8A-8D illustrate an exemplary application of the output system according to an embodiment of the present invention.

As illustrated in FIG. 8A, at first, image data is not displayed at any of the displays $400_1$-$400_3$. In other words, at first, the power of all the displays 400 of all the output apparatuses 10 is turned off.

Figure 8B:
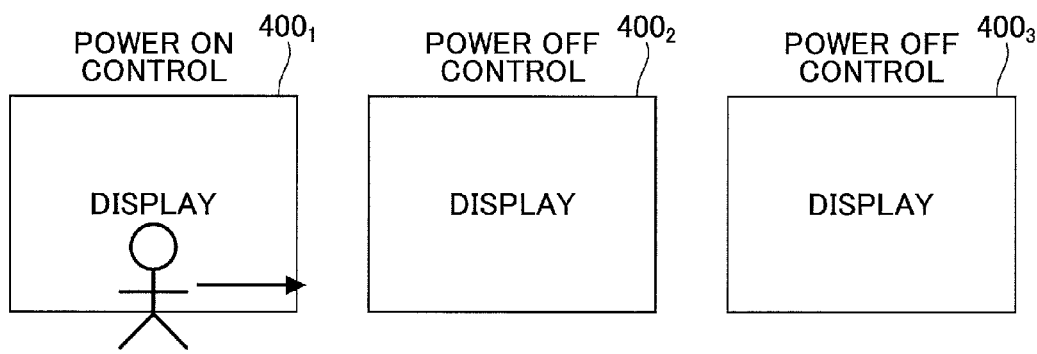

Then, as illustrated in FIG. 8B, when a person approaches the display $400_1$, the output apparatus $10_1$ detects the presence of the person, turns on the power of the display $400_1$, and prompts the display $400_1$ to display image data.

Figure 8C:
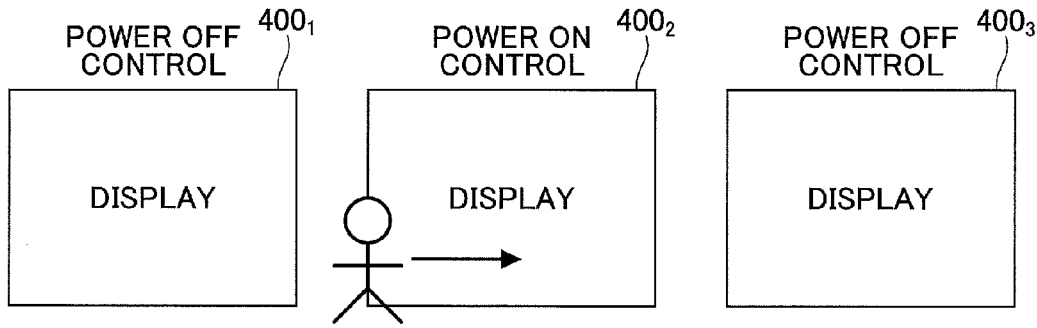

Then, as illustrated in FIG. 8C, when the output apparatus $10_1$ detects that the person has moved past the display $400_1$, the output apparatus $10_1$ turns off the power of its display $400_1$. Also, the output apparatus $10_1$ detects the direction in which the person is moving, generates control information for turning on the power of the display $400_2$ that is located toward the direction in which the person is moving, and transmits the control information to the output apparatus $10_2$. Upon receiving the control information from the output apparatus $10_1$, the output apparatus $10_2$ turns on the power of its display $400_2$, and prompts the display $400_2$ to display image data. Note that such on/off control of the power of the display 400 may be implemented by having the power control part 14 issue an instruction to the display control part (not shown) to turn on/off the power of the display 400, for example. Note, also, that the generation and transmission of control information may be performed via the control unit 20, for example.

Figure 8D:
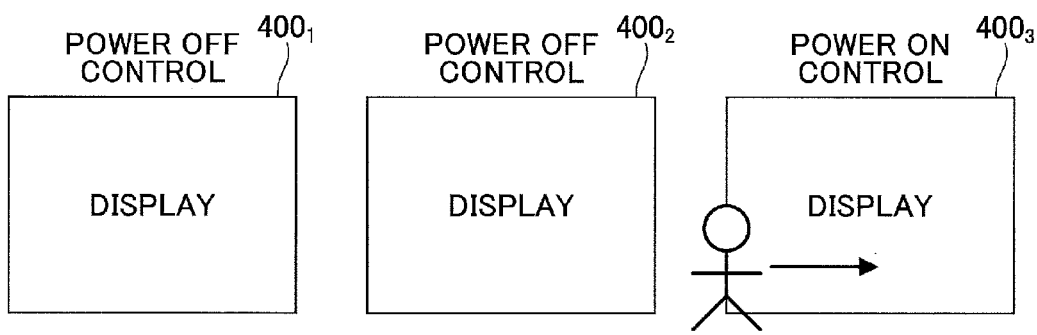

Then, as illustrated in FIG. 8D, when the output apparatus $10_2$ detects that the person has moved past the display $400_2$, the output apparatus $10_2$ turns off the power of its display $400_2$. Also, the output apparatus $10_2$ detects the direction in which the person is moving, generates control information for turning on the power of the display $400_3$ that is located toward the direction in which the person is moving, and transmits the control information to the output apparatus $10_3$. Upon receiving the control information, the output apparatus $10_3$ turns on the power of its display $400_3$, and prompts the display $400_3$ to display image data.

In this way, the output system 1 as applied to a digital signage system may be able to successively display advertisements to a person passing the plurality of displays 400, for example. Further, by turning off the power of a given display 400 once a person has moved past this display 400, unnecessary power consumption may be prevented.

According to an aspect of the output system 1 according to the present embodiment as described above, power control may be performed with respect to an output apparatus 10 that does not have to output content information and unnecessary power consumption may be prevented. In this way, overall power conservation of the output system 1 may be achieved.

Note that the control necessity determination part 21 of the above-described embodiment is an example of a determination part. The control information generation part 22 is an example of a control information generation part. The power control part 14 is an example of a power control part.

Although the present invention has been described above with reference to certain illustrative embodiments, the present invention is not limited to these embodiments, and numerous variations and modifications may be made without departing from the scope of the present invention.

The present application is based on and claims the benefit of priority of Japanese Patent Application No. 2014-126377 filed on Jun. 19, 2014, the entire contents of which are hereby incorporated by reference.

What is claimed is:

1. A control apparatus comprising:
a memory; and
a processor configured to implement processes of
transmitting content information to each output apparatus of a plurality of output apparatuses connected to the control apparatus,
controlling each output apparatus of the plurality of output apparatuses to output the content information to display a single image,
determining, based on the content information transmitted to each output apparatus, an output apparatus from among the plurality of output apparatuses that does not have to output the content information,
transmitting first control information to the determined output apparatus to switch the determined output apparatus to a power-saving mode,
determining, based on the content information to be transmitted to each output apparatus, the output apparatus switched to the power saving mode that will be outputting the content information after a predetermined time period has elapsed, and
transmitting second control information to the determined output apparatus switched to the power saving mode, at at least a prescribed time before the predetermined time has elapsed, to switch the determined output apparatus switched to the power saving mode to a power-on mode to enable the determined output apparatus switched to the power saving mode to output the content information, the prescribed time corresponding to a time required for switching the determined output apparatus switched to the power saving mode to the power-on mode.

2. The control apparatus according to claim 1, wherein the content information include image data;
the processor further implements processes of:
determining, based on luminance information of the image data included in the content information, an output apparatus that is to output image data with a luminance less than or equal to a predetermined value, and
transmitting, to the determined output apparatus, the first control information to switch the determined output apparatus to the power-saving mode.

3. The control apparatus according to claim 1, wherein the content information includes audio data;
the output apparatus further includes an audio output apparatus that outputs audio based on the audio data; and
the processor further implements processes of
determining, based on volume information of the audio data included in the content information, the audio output apparatus that is to output audio data at a volume less than or equal to a predetermined value, and
transmitting, to the determined audio output apparatus, the first control information to switch the determined audio apparatus to the power-saving mode.

4. A power control method that is implemented by a control apparatus connected to a plurality of output apparatuses, the power control method comprising:
transmitting content information to each output apparatus of the plurality of output apparatuses connected to the control apparatus,
controlling each output apparatus to output the content information to display a single image,
determining, based on the content information transmitted to each output apparatus, an output apparatus from among the plurality of output apparatuses that does not have to output the content information,
transmitting first control information to the determined output apparatus to switch the determined output apparatus to a power-saving mode, determining, based on the content information to be transmitted to each output apparatus, the output apparatus switched to the power saving mode that will be outputting the content information after a predetermined time period has elapsed, and transmitting second control information to the determined output apparatus switched to the power saving mode, at at least a prescribed time before the predetermined time has elapsed, to switch the determined output apparatus switched to the power saving mode to a power-on mode to enable the determined output apparatus switched to the power saving mode to output the content information, the prescribed time corresponding to a time required for switching the determined output apparatus switched to the power saving mode to the power-on mode.

5. A non-transitory computer readable recording medium storing an information processing program that is executed by a processor of a control apparatus connected to a plurality of output apparatuses, the execution of the information processing program causing the processor to implement processes of:

transmitting content information to each output apparatus of the plurality of output apparatuses connected to the control apparatus, controlling each output apparatus to output the content information to display a single image, determining, based on the content information transmitted to each output apparatus, an output apparatus from among the plurality of output apparatuses that does not have to output the content information, transmitting first control information to the determined output apparatus to switch the determined output apparatus to a power-saving mode, determining, based on the content information to be transmitted to each output apparatus, the output apparatus switched to the power saving mode that will be outputting the content information after a predetermined time period has elapsed, and transmitting second control information to the determined output apparatus switched to the power saving mode, at at least a prescribed time before the predetermined time has elapsed, to switch the determined output apparatus switched to the power saving mode to a power-on mode to enable the determined output apparatus switched to the power saving mode to output the content information, the prescribed time corresponding to a time required for switching the determined output apparatus switched to the power saving mode to the power-on mode.

* * * * *